2,939,860
POLYPROPYLENE-BUTYL RUBBER BLENDS

Charles K. Schramm, Westfield, N.J., assignor to Esso Research and Engineering Company, a corporation of Delaware No Drawing. Filed May 8, 1957, Ser. No. 657,711

3 Claims. (Cl. 260—45.5)

This invention relates to an improvement in the low temperature characteristics of polypropylene plastics. More particularly it relates to blends of "low pressure" polypropylene and butyl rubber having an unsaturation between about 1.30 and 2.5 mole percent.

In the recent past so-called "low-pressure" polypropylene has been attracting increasing attention as a plastic competitive with polyethylene. As is well known, "low pressure" polypropylene plastic of desirably high molecular weight is readily obtained by polymerizing propylene at atmospheric or moderately superatmospheric pressure with the aid of a Ziegler catalyst such as the reaction product of titanium tetrachloride or trichloride and aluminum triethyl, wherein the titanium halide of reduced valence such as $TiCl_3$ or $TiCl_{2.5}$ in conjunction with some free aluminum alkyl is generally considered to constitute the actual active catalyst. However, one of the drawbacks of such "low-pressure" polyproylene plastics has been their relatively poor performance at low temperatures. In particular, this has tended to limit their utility as a packaging material for frozen foods, wire and cable insulation, plastic pipe, etc.

It is an object of the present invention to improve the low temperature properties of "low pressure" polypropylene. A more specific object is to improve these properties by blending the polypropylene plastic with other materials, without causing an unduly severe loss in tensile strength and other physical properties. In particular it is the object of this invention to blend polypropylene with minor amounts of suitable rubbery polymers so as to produce blends characterized by a Bell brittleness of —40° C. or better and by an improved flexibility in the +25° C. to —50° C. range.

These and other objects, as well as the general nature and advantages of the invention will become more clearly apparent from the subsequent description. In this description it should be understood that all amounts and proportions of materials are expressed on a weight basis unless otherwise indicated.

It has now been discovered that the desired improvement in low temperature properties can be obtained by blending the "low pressure" polypropylene with rubbery polymers, provided that the rubbery material is of a carefully defined type and provided further that it is used in the proper proportions. More specifically it has been discovered that butyl rubber possessing unsaturation in the 1.30 to 2.5 mole percent range, is quite unique, especially when used in proportions of about 15% to 30%, preferably about 20 to 25% based on total polymer.

By contrast, more unsaturated rubbers such as natural rubber, GR-S, or even the more unsaturated species of butyl rubber itself, as well as butyl rubber species possessing less than the aforementioned minimum unsaturation, are distinctly less effective in improving the low temperature properties of polypropylene. Another surprising aspect of this invention is that while the degree of unsaturation of the rubber is highly critical, the beneficial improvement has been found to be essentially independent of the molecular weight of the butyl rubber used for blending.

The proportion of butyl rubber is also important. With less than 15% butyl rubber in the blend the improvement in low temperature brittleness becomes insufficient. On the other hand, when polypropylene is blended with more than 30% butyl rubber, structural properties of the plastic are greatly impaired.

Of course, depending on the desired properties of the end product, various fillers, stabilizers, curing aids or other auxiliary agents may be compounded into the polypropylene-butyl rubber blend. For instance, for pipe or wire and cable applications it may be advantageous to mix from 2 to 50% of carbon black with the polymers and thereby improve the resistance of the plastic to ultraviolet radiation. Alternately, the plastic blend may be cured or partly cured in a variety of ways. Thus, the blend may be compounded with 0.5 to 5% of p-dinitrosobenzene and heat cured in a compression mold or the like at a temperature sufficient to melt the polypropylene, e.g. at 175° C. Or, a butyl rubber containing about 1 to 2 mole percent chlorine can be used instead of the all-hydrocarbon rubber and the resulting blend cured with the aid of zinc oxide. The cured blends generally will be less extensible, and have a higher elastic modulus and somewhat poorer low temperature brittleness than the analogous uncured blends.

In practicing the present invention it will be noted that two individually known polymers are required. The principal one of these is so-called "low pressure" polypropylene. This polymer is typically characterized by a molecular weight of about 50,000 to 500,000 (Harris correlation, J. Polymer Science, 8, 361 (1952), a crystallinity of 40 to 95% (preferably 60 to 90%), density of about 0.86 to 0.91, high softening point (115°–145° C.), high melting point (125°–165° C.), high tensile strength (1000 to 5500 p.s.i.), high rigidity at low temperature (1,000,000 to 6,000,000 p.s.i. at —50° C.), poor low temperature (Bell) brittleness (above 0° C.), good stress cracking resistance, a steep melt viscosity-temperature relationship, etc. This material, as is well known, can be prepared by polymerizing propylene at or near atmospheric pressure with the aid of a Ziegler polymerization catalyst, e.g. as described in Belgian Patent 538,782. For the sake of convenience the essential features of this known Ziegler-type polymerization process will be briefly recapitulated. The Ziegler catalyst is a solid insoluble reaction product obtained by reducing a reducible compound of a group IVB–VIB or VIII heavy metal or manganese, etc. with a reducing organometallic compound of an alkali metal, alkaline earth, rare earth or zinc metal compound, or by reducing an appropriate metal compound with the aid of metallic aluminum, or a mixture of aluminum and titanium, etc. The preferred catalyst of this type is usually prepared by reducing 1 mole of a titanium tetrahalide, notably tetrachloride, to the corresponding trivalent or subtrivalent titanium halide with about 0.2 to 6 moles of aluminum triethyl, triisobutyl or other aluminum alkyl compound of the formula RR'AlX. In this formula R, R' and X preferably are alkyl groups of 2 to 8 carbon atoms, although X may alternatively be hydrogen or a halogen, notably chlorine. The reduction is best carried out by dissolving each of the two catalyst components in an inert solvent, notably a $C_3$ to $C_{18}$ paraffin such as isopentane or n-heptane, and mixing the two solutions in the proper proportions at temperatures between 0° and 150° C. and in the absence of moisture, oxygen and sulfur impurities. The resulting precipitate in conjunction with some free aluminum alkyl compound is generally considered to constitute the actual active polymerization catalyst. Consequently, it has been considered best to carry out the catalyst preparation using only about 0.3 to 0.8 mole of the aluminum alkyl compound per mole of titanium chloride, and then add a supplemental amount of the aluminum alkyl compound to the polymerization zone to raise the Al/Ti mole ratio therein to a value between about 1:1 and 3:1.

Propylene monomer is then contacted with the resulting catalyst in the presence of the inert hydrocarbon solvent such as isopentane, n-heptane, xylene, etc. The polymerization is conveniently effected at temperatures of about 0° to 100° C. and pressures ranging from about 0 to 500 p.s.i.g., usually 0 to 50 p.s.i.g. The catalyst concentration in the polymerization zone is preferably in the range of about 0.1 to 0.5% based on total liquid, and the polymer product concentration in the polymerization zone is preferably kept between about 2 to 25% based on total contents so as to allow easy handling of the polymerized mixture. The proper polymer concentration can be obtained by having enough of the inert diluent present or by stopping the polymerization short of 100% conversion, etc. When the desired degree of polymerization has been reached, a $C_1$ to $C_8$ alkanol such as isopropyl alcohol or n-butyl alcohol, desirably in combination with a chelating agent such as acetyl acetone is normally added to the reaction mixture for the purpose of dissolving and deactivating the catalyst and for precipitating the polymer product from solution. After filtration, the solid polymer may be further washed with alcohol or acid such as hydrochloric acid, dried, compacted and packaged.

The other essential material of this invention is butyl rubber. This well-known material can be prepared by copolymerizing isobutylene with a small amount of a conjugated $C_4$ to $C_6$ diolefin, especially isoprene, according to the method described by Sparks and Thomas in Patent 2,356,128. The polymerization is usually carried out at a temperature of about −100° C. using a Friedel-Crafts metal halide catalyst, notably aluminum trichloride in solution in methyl or ethyl chloride. As stated before, for the purposes of this invention it is critical that the butyl rubber used have an unsaturation of about 1.30 to 2.5 mole percent, preferably 1.35 to 2 mole percent. Accordingly, the suitable polymers can be obtained from feed mixtures containing about 96.7 to 97.5% isobutylene and correspondingly 3.3 to 2.5% isoprene. Of course, various grades of butyl rubber ranging in unsaturation from about 1 to 5 mole percent are readily available as commercial products. To determine whether any particular grade of butyl rubber is suitable for use in this invention, its unsaturation may be readily determined by ozone degradation or preferably by the method based on reaction with iodine in the presence of mercuric acetate and trichloroacetic acid as described in Ind. Eng. Chem., 40, 1277–80 (1948). As long as the butyl rubber has an unsaturation in the specified range of 1.30 to 2.5%, it may have a molecular weight anywhere from about 250,000 to 2,000,000 or more, preferred butyl rubber polymers having a viscosity average molecular weight between about 300,000 and 600,000 (intrinsic viscosity in diisobutylene).

In preparing the blends of this invention it is desirable to blend about 15 to 35 parts of the butyl rubber with 100 parts of the "low pressure" polypropylene. The blending may be done in conventional mixing equipment such as a rubber mill or a Banbury mixer, mixing temperatures in the range of 125° to 180° C. being suitable. Antioxidant stabilizers such as N-lauroylaminophenol or the like may be added during this blending operation in amounts of about 0.05 to 0.15%. As mentioned earlier, other optional compounding ingredients may be blended in similarly.

EXAMPLES

The invention will now be illustrated further by specific working examples. A series of plastic blends was prepared by mixing 75 parts of "low pressure" polypropylene with 25 parts of various rubbery polymers, including several grades of butyl rubber that differed from each other in terms of unsaturation. The polypropylene used had the following characteristics.

Properties of polypropylene:
| | |
|---|---|
| Heptane insoluble, wt. percent | 75 |
| Intrinsic viscosity | 3.21 |
| Molecular weight (Harris) | 175,000 |
| Soft./melting pt., °C | 163/173 |
| Density | 0.892 |
| Tensile strength, p.s.i | 2700 |
| Elongation, percent | 850 |
| Mod. of rigidity at 25° C., p.s.i.×$10^{-5}$ | 0.38 |
| Melt index at 190° C | 0.1 |

Synthesis conditions:
Catalyst preparation—
| | |
|---|---|
| Temperature °C | 160 |
| Time, minutes | 60 |
| Concentration ($TiCl_4$+$AlEt_3$), g./l | 53 |
| Al/Ti mole ratio | 0.33 |

Polymerization conditions:
| | |
|---|---|
| Cat. Conc., wt. percent | 0.30 |
| Al/Ti mole ratio | 2.0 |
| Temperature, °C | 52 |
| Cat. efficiency, g. polymer/g. cat | 62 |

The blends were prepared by milling the ingredients at 177° C. for 3 to 5 minutes. Test samples were prepared from the blends by compression molding at 190° C. for five minutes, followed by cooling under pressure. In all cases the polypropylene was compatible with the materials tested. These blends were tested to determine their tensile properties at room temperature as well as their brittleness and flexibility at low temperatures. The resulting data are summarized in Table I which, for purposes of comparison, also includes the corresponding data for the unblended polypropylene.

*Table I*

PHYSICAL PROPERTIES OF POLYPROPYLENE AND ITS BLENDS (25%) WITH MISCELLANEOUS ELASTOMERS

| Sample No. | 1 | 2 | 3 | 4 | 5 | 6 | 7 | 8 | 9 |
|---|---|---|---|---|---|---|---|---|---|
| Sample Composition: | | | | | | | | | |
| Polypropylene, percent | 100 | 75 | 75 | 75 | 75 | 75 | 75 | 75 | 75 |
| Elastomer, percent | 0 | 25 | 25 | 25 | 25 | 25 | 25 | 25 | 25 |
| Elastomer: | | | | | | | | | |
| Type | | "Butyl 035" | "Butyl 218X" | "Butyl 150" | "Butyl 218" | "Butyl 325" | "Butyl CX" | GR-S-1500 [1] | Smoked Sheet [2] |
| Unsaturation, mole percent | | 0.90 | 1.00 | 1.28 | 1.38 | 2.00 | 7.2 | 75.0 | 100.0 |
| Molecular Weight × $10^{-3}$ | | 325 | 1,200 | 310 | 505 | 325 | | | |
| Blend Properties: | | | | | | | | | |
| Tensile Strength, p.s.i | 2,700 | 2,100 | 2,350 | 1,950 | 2,100 | 2,500 | | | |
| Ultimate Elong., percent | 850 | 700 | 725 | 700 | 750 | 800 | | | |
| Bell Brittleness, °F.[3] | +30 | −10 | −20 | −30 | −40 | −40 | −30 | −20 | −20 |
| Modulus of Rigidity, p.s.i. × $10^{-3}$ @— | | | | | | | | | |
| 25° C | 0.38 | | 0.35 | | | 0.27 | | | |
| 15° C | 0.61 | | 0.45 | | | 0.35 | | | |
| 0° C | 1.43 | | 0.81 | | | 0.49 | | | |
| −15° C | 4.05 | | 1.76 | | | 1.61 | | | |
| −25° C | 4.42 | | 2.13 | | | 2.09 | | | |
| −50° C | 5.40 | | 2.89 | | | 3.22 | | | |

[1] Emulsion copolymer of 75% butadiene—25% styrene.
[2] Natural rubber.
[3] ASTM Test No. D746-52T, (a) specimen clamp and striking member.

It can be seen that as much as 25% of butyl rubber may be blended into polypropylene without markedly affecting the ultimate tensile strength and elongation. However, more significant is the fact that only very few of the added materials were capable of reducing the brittleness temperature of the blend to −40° F. or less. (Brittleness measurement were made at intervals at 10° F. The temperature reported is that at which the sample last passed the test. Thus, the reported temperatures may be as much as 9° F. on the conservative side.) More specifically it is noted that only samples 5 and 6, compounded with butyl rubber of an unsaturation of 1.38 and 2.0 respectively, passed the brittleness test at −40° F. (−40° C.). Samples 7–9, containing the more unsaturated elastomers, as well as samples 1–4, containing the less unsaturated butyl rubber or no added rubber whatever, cracked in the −40° F. test. In fact, samples 2 and 3, which contained butyl rubber of 1 mole percent unsaturation or less, did not even pass the −30° F. test although, in comparison with the unblended polypropylene, they did show a considerably improved modulus of rigidity at low temperatures. In addition, the plastic blends containing more highly unsaturated rubbers such as GR–S or natural rubber have been found to undergo quite rapid oxidative degradation, especially when the rubber component is not vulcanized. On the other hand, when it is vulcanized the resulting blend becomes quite rigid and its low temperature brittleness is further impaired. Of course, the unblended polypropylene became brittle as soon as it was cooled only slightly below ordinary freezing temperatures.

Those skilled in the art will readily appreciate the great practical importance of the present invention as a Bell brittleness temperature of −40° is generally considered the maximum permissible for electric wire and cable insulation and similar materials requiring equally rigid specifications. Plastics that have a brittleness temperature of −30° F. or higher are not generally acceptable for such purposes. It can also be noted that the preferred blend (sample 6) had significantly better flexibility in the +25° to −25° C. range than the unblended polypropylene as well as the less unsaturated butyl blend (sample 3).

It is of interest that within the limits tested the correlation between blend brittleness and unsaturation of the butyl rubber appears to be independent of the molecular weight of the latter. Thus, for instance, samples 5 and 6 exhibited closely similar brittleness characteristics despite a very substantial difference in the molecular weight of the respective butyl rubbers used therein. Conversely, samples 2, 4 and 6 showed substantial differences in low temperature brittleness depending on the relative unsaturation of the several butyl rubbers used, despite the fact that the molecular weight of the rubbers was substantially the same in all three instances.

Having described the general nature and advantages of the invention and having illustrated it by specific examples, its scope is particularly pointed out in the appended claims which, of course, should be read in the light of the foregoing specification and of the state of the prior art.

The invention claimed is:

1. A composition of matter comprising (a) 100 parts of a solid plastic propylene polymer characterized by a molecular weight of about 50,000 to 500,000, density between 0.86 and 0.91, a melting point above 125° C., a crystallinity of 40 to 95% and a tensile strength above 1,000 p.s.i.; and (b) 15 to 35 parts of butyl rubber which is a copolymer of isobutylene and a conjugated $C_4$ to $C_8$ diolefin, said copolymer characterized by an unsaturation of about 1.30 to 2.5 mole percent.

2. A composition of matter according to claim 1 wherein the copolymer contains 97.5 to 98.7 mole percent of combined isobutylene and correspondingly 2.5 to 1.3 mole percent of combined isoprene and possesses a molecular weight in the range of 250,000 to 2,000,000.

3. A composition of matter having a Bell brittleness temperature not greater than −40° F. and comprising (a) 100 parts of a solid plastic polypropylene having a molecular weight of 150,000 to 250,000, a crystallinity of 40 to 95% and a density of 0.86 to 0.91 and (b) 15 to 35 parts of a copolymer containing 98 to 98.65 mole percent of combined isobutylene and 1.35 to 2 mole percent of combined isoprene and possessing a molecular weight between about 250,000 and 600,000.

References Cited in the file of this patent

UNITED STATES PATENTS

| | | |
|---|---|---|
| 2,472,495 | Sparks | June 7, 1949 |
| 2,569,541 | Selby | Oct. 2, 1951 |

OTHER REFERENCES

Natta: J. Am. Chem. Soc., 77, page 1708 (1955).
Hunter-Oakes; British Plastics, 17, page 94, March 1945.